US006594374B1

(12) United States Patent
Beckstrom et al.

(10) Patent No.: US 6,594,374 B1
(45) Date of Patent: Jul. 15, 2003

(54) POSTAGE PRINTING SYSTEM HAVING GRAPHICAL RELATIONSHIP BETWEEN POSTAL INDICIUM LABEL AND ADDRESS LABEL SEGMENTS

(75) Inventors: David W. Beckstrom, Fairfield, CT (US); Fran E. Blackman, Weston, CT (US); John L. Campo, Vienna, VA (US); James A. Salomon, Cheshire, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/433,482

(22) Filed: Nov. 4, 1999

(51) Int. Cl.[7] .................................... G06K 9/00

(52) U.S. Cl. .................................... 382/101; 382/175

(58) Field of Search .................................... 382/100, 101, 382/102, 175, 180; 358/1.18; 705/408, 410, 62, 401; 110/212, 490; 235/375

(56) References Cited

U.S. PATENT DOCUMENTS

| | | | | | |
|---|---|---|---|---|---|
| 4,065,117 | A | | 12/1977 | Thorsheim | 270/58 |
| 4,641,347 | A | * | 2/1987 | Clark et al. | 101/71 |
| 4,660,221 | A | * | 4/1987 | Dlugos | 101/71 |
| 4,717,059 | A | | 1/1988 | Takahashi | 26/2 |
| 4,743,747 | A | | 5/1988 | Fougere et al. | 235/494 |
| 4,837,701 | A | * | 6/1989 | Sansone et al. | 705/404 |
| 4,934,846 | A | | 6/1990 | Gilham | 400/104 |
| 4,939,674 | A | | 7/1990 | Price et al. | 364/523 |
| 5,051,565 | A | | 9/1991 | Wolfram | 235/384 |
| 5,129,682 | A | | 7/1992 | Ashby | 283/81 |
| 5,159,667 | A | * | 10/1992 | Borrey et al. | 715/500 |
| 5,200,903 | A | | 4/1993 | Gilham | 364/464.02 |
| 5,270,522 | A | | 12/1993 | Bone, Jr. | 235/375 |
| 5,292,008 | A | | 3/1994 | Sansone et al. | 209/584 |
| 5,383,685 | A | * | 1/1995 | Lee | 283/58 |
| 5,384,886 | A | * | 1/1995 | Rourke | 705/411 |
| 5,388,049 | A | | 2/1995 | Sansone et al. | 364/464.02 |
| 5,407,718 | A | | 4/1995 | Popat et al. | 428/42 |
| 5,470,427 | A | | 11/1995 | Mikel et al. | 156/387 |
| 5,486,055 | A | | 1/1996 | Oka | 400/61 |
| 5,501,393 | A | | 3/1996 | Walz | 229/92.8 |
| 5,547,227 | A | | 8/1996 | Laurash et al. | 283/81 |
| 5,573,277 | A | | 11/1996 | Petkovsek | 283/79 |
| 5,617,481 | A | * | 4/1997 | Nakamura | 382/101 |
| 5,621,864 | A | | 4/1997 | Benade et al. | 395/117 |
| 5,640,447 | A | | 6/1997 | Fonesca | 379/144 |
| 5,664,725 | A | | 9/1997 | Walz | 229/92 |
| D386,204 | S | | 11/1997 | Kara | D19/3 |
| D386,783 | S | | 11/1997 | Kara | D19/1.3 |
| 5,697,648 | A | | 12/1997 | Petkovsek | 283/61 |
| 5,717,597 | A | | 2/1998 | Kara | 364/464.18 |

(List continued on next page.)

FOREIGN PATENT DOCUMENTS

DE 3233005 A 9/1982

OTHER PUBLICATIONS

PCT—International Publication No.: WP 99/15340, International Publication Date: Apr. 1, 1999, International Filing Date Sep. 22, 1998, Inventor: Block, David L.

U.S. patent application 09/690,284.

*Primary Examiner*—Jayanti K. Patel
(74) *Attorney, Agent, or Firm*—George M. Macdonald; Angelo N. Chaclas; Charles R. Malandra, Jr.

(57) ABSTRACT

A method of producing a mailpiece including the following steps: (i) printing a postal indicium and a first inspection image on a first label segment; and (ii) printing a recipient address and a second inspection image on a second label segment; (iii) applying the first label segment and the second label segment to the mailpiece. The first inspection image and the second inspection image have a human visible relationship indicating that the first label segment and the second label segment correspond to each other.

24 Claims, 5 Drawing Sheets

U.S. PATENT DOCUMENTS 5,734,723 A * 3/1998 Windel et al. ................ 380/51
D395,333 S 6/1998 Kara ............................ D19/3
5,803,498 A * 9/1998 Tung et al. ................... 283/56
5,806,421 A 9/1998 Dolan et al. ............. 101/93.01
5,829,895 A 11/1998 Hayashi et al. ........ 400/124.05
5,848,401 A 12/1998 Goldberg et al. ........... 705/408
5,848,810 A 12/1998 Beaudoin et al. ............. 283/67
5,876,555 A 3/1999 Hellsund et al. ............ 156/540
5,925,864 A 7/1999 Sansone et al. ............. 235/375
5,929,415 A 7/1999 Berson ....................... 235/382
5,944,461 A 8/1999 Kanbar ....................... 408/705
6,010,156 A * 1/2000 Block ............................ 281/2
6,142,380 A 11/2000 Sansone et al. ............. 235/487
6,188,996 B1 2/2001 Sansone ..................... 705/404
6,209,920 B1 4/2001 Fabel .......................... 283/62
6,244,763 B1 6/2001 Miller ......................... 400/76
6,296,404 B1 10/2001 Pierce et al. .................. 400/62
6,427,021 B1 * 7/2002 Fischer et al. .............. 382/100
2001/0023408 A1 9/2001 Mc.Evoy et al. ............. 705/14

* cited by examiner

POSTAGE PRINTING SYSTEM HAVING GRAPHICAL RELATIONSHIP BETWEEN POSTAL INDICIUM LABEL AND ADDRESS LABEL SEGMENTS

CROSS REFERENCE TO RELATED APPLICATIONS

This application is related to the following co-pending applications filed concurrently herewith and commonly assigned to the assignee of this application: U.S. patent application Ser. No. 09/433,481, entitled POSTAGE PRINTING SYSTEM HAVING LABEL PRINTING CAPABILITY, which is specifically incorporated herein by reference.

FIELD OF THE INVENTION

This invention relates generally to postage printing systems. More particularly, this invention is directed to a postage printing system including a printer and a label stock adapted to be fed through the printer where the printer prints postal payment information on a first label segment and a destination address on a second label segment.

BACKGROUND OF THE INVENTION

Postage printing systems are well known in the art. A typical postage meter (one example of a postage printing system) includes an accounting structure and a printer so as to apply evidence of postage, commonly referred to as postal indicia, to an envelope or other mailpiece and accounts for the value of the postage dispensed. Generally, the accounting structure and the printer are integrated into the same housing and are dedicated devices. Examples of such postage printing systems are the PostPerfect® postage meter and the Paragon® II mail processor, both of which are available from Pitney Bowes Inc. of Stamford, Conn.

As is well known, postage meters include an ascending register, that stores a running total of all postage dispensed by the meter, and a descending register, that holds the remaining amount of postage credited to the meter and that is reduced by the amount of postage dispensed during a transaction. The postage meter generally also includes a control sum register that provides a check upon the descending and ascending registers. The control sum register has a running account of the total funds having been added into the meter. As a result, the control sum register must always correspond with the summed readings of the ascending and descending registers. Thus, the control sum register is the total amount of postage ever put into the machine and it is alterable only when adding funds to the meter. In this manner, by inspecting the various registers and securing them from tampering, the dispensing of postal funds may be accurately recorded, tracked and accounted for.

More recently, postage printing systems have been developed where the accounting structure described above is physically separated from the printer. In some postage printing systems, the accounting structure is not even resident with the user of the postage printing system. For example, in a "virtual postage meter" environment, the user does not possess a physical accounting structure as described above. Instead, postage is dispensed electronically over suitable communication channels (LAN, WAN, telephone lines, Internet, etc.) to a personal computer and printed using a general purpose printer, such as those commonly available from Hewlett-Packard, Canon, Epson and others, attached to the personal computer. The user maintains an account with a remotely located data center (maintained by an authorized postage meter manufacturer) and receives postage securely using appropriate electronic data interchange techniques. At a later time, the user is invoiced for the amount of postage dispensed and any other fees associated with maintaining the account with the data center. In other types of postage metering systems, the user does maintain a small electronic device attached to a personal computer that services as the accounting structure described above. However, in both types of systems, the user utilizes the general purpose printer for printing postage indicia.

Oftentimes, a secret code or token is derived from information particular to the mailpiece (the indicated postage amount, date, recipient address information, etc.) and is incorporated or embedded into the postal indicium for later use by a postal authority in verifying the integrity of the postal indicium. Thus, the postal authority typically requires a correspondence between the postal indicium and its associated address. Examples of such systems are described in U.S. Pat. No. 4,725,718 and U.S. Pat. No. 5,454,038.

These types of postage printing systems require that the user feed the mailpiece through the general purpose printer so that a postal indicium may be printed thereon. In the case where the mailpiece is a standard size business envelope, such as a #10 envelope, this may be accomplished with relative ease once the idiosyncrasies of feeding envelopes through the printer (input location, orientation, registration, etc.) have been learned. On the other hand, other types of mailpieces, such as: small envelopes, oversized envelopes, thick envelopes, post cards, boxes, tubes, etc., are irregularly sized and cannot be fed through general purpose printers. Thus, other arrangements must be made to accommodate applying postage indicia to these types of irregular mailpieces.

To address this issue, it is known to print postage indicia on labels and apply the labels to the irregular mailpieces. Generally, the label stock may be fed through the general purpose printer to effect printing postage indicia. Alternatively, where increased productivity is desired, the general purpose printer may be replaced with a specialized label printer such as those commonly available from CoStar Corporation of Greenwich, Conn. or Eltron International, Inc. of California. An example of such a postage printing system including a specialized label printer is described in PCT patent application number PCT/US98/19688, entitled A COMBINATION ADDRESS AND POSTAGE LABEL AND SYSTEM FOR PRODUCING THE SAME, published on Apr. 1, 1999. In this system, blank adhesive label stock containing separable label segments is fed through the printer. Once the postal indicium, address and other data has been printed, the user separates the individual label segments and places them on a mailpiece.

Although such a system may prove useful, it suffers from certain drawbacks and disadvantages. First, there is a risk that the user may not locate the label segments properly on the mailpiece. For example, postal authority requirements usually dictate the location of the postal indicium on the mailpiece and the necessary spacing of the address field and other printed matter with respect to the postal indicium. In this manner, the mailpiece may be more easily processed by the automated mail handling equipment. Second, there is a risk that the user may inadvertently mix label segments intended for one mailpiece with label segments intended for another mailpiece. For example, it is not visually discernable which postal indicium label segment goes with which address label segment. Therefore, due to human error, if two labels are printed, a postal indicium label segment from a first label and an address label segment from a second label may be placed on one mailpiece while a postal indicium label segment from a second label and an address label segment from a first label may be placed on another mailpiece. The result is that the postal authority will reject both mailpieces during the verification process and return them to the user because of the unique correspondence between each postal indicium and its address described above. This wastes time and money for both the user and the postal authority.

Therefore, there is a need for an improved postage printing system for printing on label stock that provides safeguards for handling label segments. More particularly, there is a need for a postage printing system including a printer and a label stock adapted to be fed through the printer where the printer prints postal payment information on a first label segment, a destination address on a second label segment and graphical information on both the first label segment and the second label segment that provides for a visual association between the segments.

SUMMARY OF THE INVENTION

The present invention provides methods and a system for improving the ability of humans to recognize a correspondence between a postal indicium label and a recipient address label. Generally, this is accomplished by producing inspection images on each of the labels that humans would visually recognize as have a relationship that would indicate that they correspond to each other.

In accordance with the present invention, a method of producing a mailpiece includes the following steps: (i) printing a postal indicium and a first inspection image on a first label segment; and (ii) printing a recipient address and a second inspection image on a second label segment; (iii) applying the first label segment and the second label segment to the mailpiece. The first inspection image and the second inspection image have a human visible relationship indicating that the first label segment and the second label segment correspond to each other.

In accordance with the present invention, a method of operating a postage printing system and a postage printing system are also provided.

Therefore, it is now apparent that the present invention substantially overcomes the disadvantages associated with the prior art. Additional advantages of the invention will be set forth in the description that follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

DETAILED DESCRIPTION OF THE PREFERRED EMBODIMENTS

Figure 1:
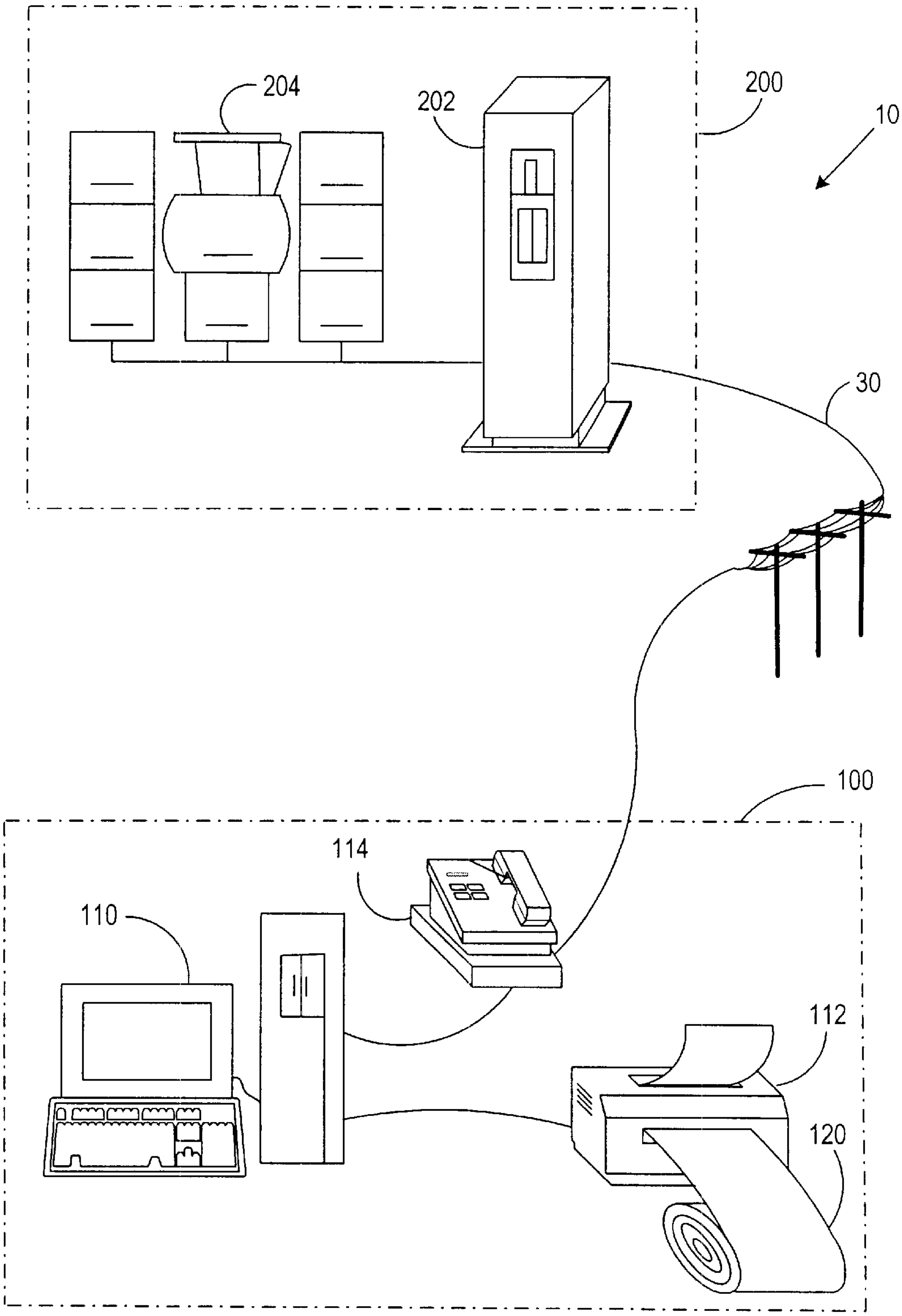
FIG. 1 is a simplified representation of a postage printing system in which the present invention may be incorporated.

Referring to FIG. 1, an example of a postage printing system 10, indicative of one example of a virtual postage metering environment, in which the present invention may be incorporated is shown. The particular configuration of the postage metering functionality and the configuration of the postage indicium do not constitute a part of the present invention. Therefore, for the sake of brevity and clarity only minimal background and that which is necessary for an understanding of the present invention will be described. Generally, the postage printing system 10 includes a computer system 100 and a remotely located data center 200. The computer system 100 is in communication over any suitable communication network 30 (LAN, WAN, telephone line, internet, etc.) with the data center 200. The computer system 100 may be comprised of any type of conventional computing and peripheral devices, such as: a personal computer, a virtual terminal, a workstation, a laptop computer, printer, modem or the like. In the preferred embodiment, the computer system 100 includes a personal computer 110 in operative communication with a printer 112 and a modem 114 for interfacing with the data center 200. The data center 200 includes a conventional computing device 202, such as a central server, and a database 204 for maintaining user account records.

Generally, it is anticipated that the computer system 100 may be located in small business offices and/or in private residences and used for a variety of purposes, including obtaining postage. Thus, the computer systems 100 are representative of users wanting to obtain postage for their mailpieces (envelopes, post cards, packages and the like). The data center 200 is maintained and operated by an authorized postage meter manufacturer, some other authorized agency or a postal authority. The computer system 100 may be connected directly to the printer 112 or have access to a printer 112 over any suitable communication network (not shown). Those skilled in the art will recognize that many computer systems 100 may be connected with the data center.

Figure 3:
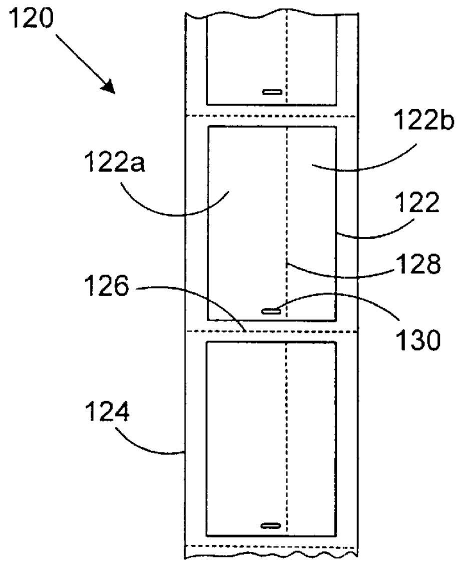
FIG. 3 is a front view of a web of label stock.

Referring to FIGS. 1 and 3, in the preferred embodiment, the printer 112 is a dedicated label printer that is adapted to feed a web of label stock 120. The label stock 120 includes a plurality of adhesive labels 122 applied to a backing layer 124 and separated by transverse label separation perforation lines 126. Each of the plurality of adhesive labels 122 include a postal indicium label segment 122*a* and an address label segment 122*b* separated by a segment perforation line 128. Additionally, each of the plurality of adhesive labels 122 includes a timing hole 130 for registration of the label 122 within the printer 112.

Figure 2:
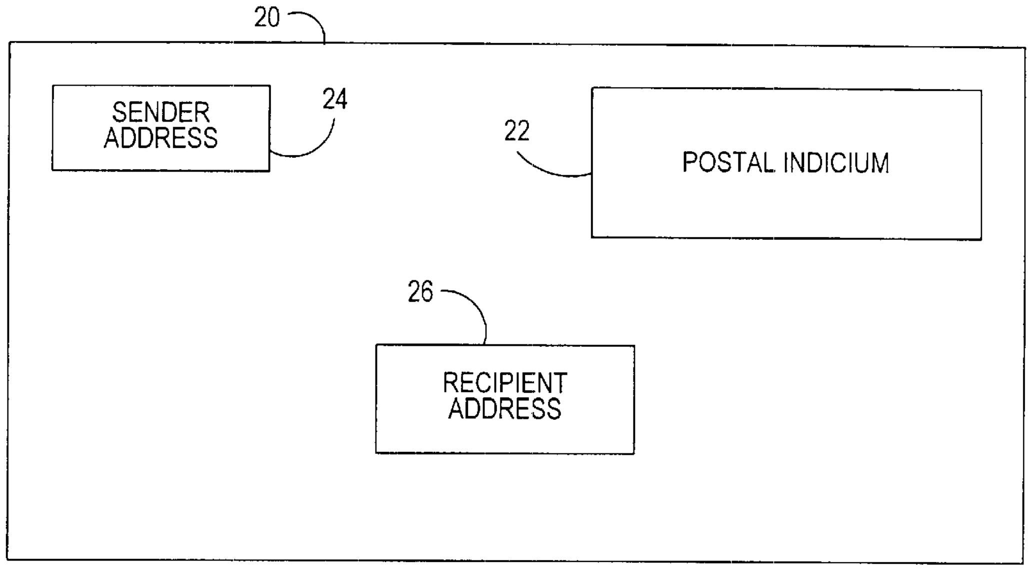
FIG. 2 is a front view of an envelope showing the available printing fields.

Referring to FIG. 2, an envelope 20 including representations of the various fields designated for printing is shown. Most typically, the envelope 20 includes a postal indicium 22, a sender address 24 and a recipient address 26. It is well known that the postal indicium 22 is subject to regulation by the relevant postal authority. Generally, the postal indicium 22 includes both fixed data (not shown) that does not change from mailpiece to mailpiece and variable data (not shown) that may change from mailpiece to mailpiece. The fixed data may include a graphic design, a meter serial number 32 uniquely identifying the postage meter or user account (not shown) and a licensing or receiving post office identifier such as a zip code (not shown). Generally, the variable data includes a date (not shown) indicating when the postage was dispensed, a postal value (not shown) indicating an amount of postage and other data (not shown) for use by the postal authority in verifying the authenticity of the postal indicium 22 using conventional techniques. However, those skilled in the art will recognize that the exact content of both the fixed data and variable data is subject to regulation by the postal authority and a matter of design choice. For example, in a virtual meter environment the meter serial number may not be used and the receiving post office identifier (zip code) may be variable data.

Figure 4:
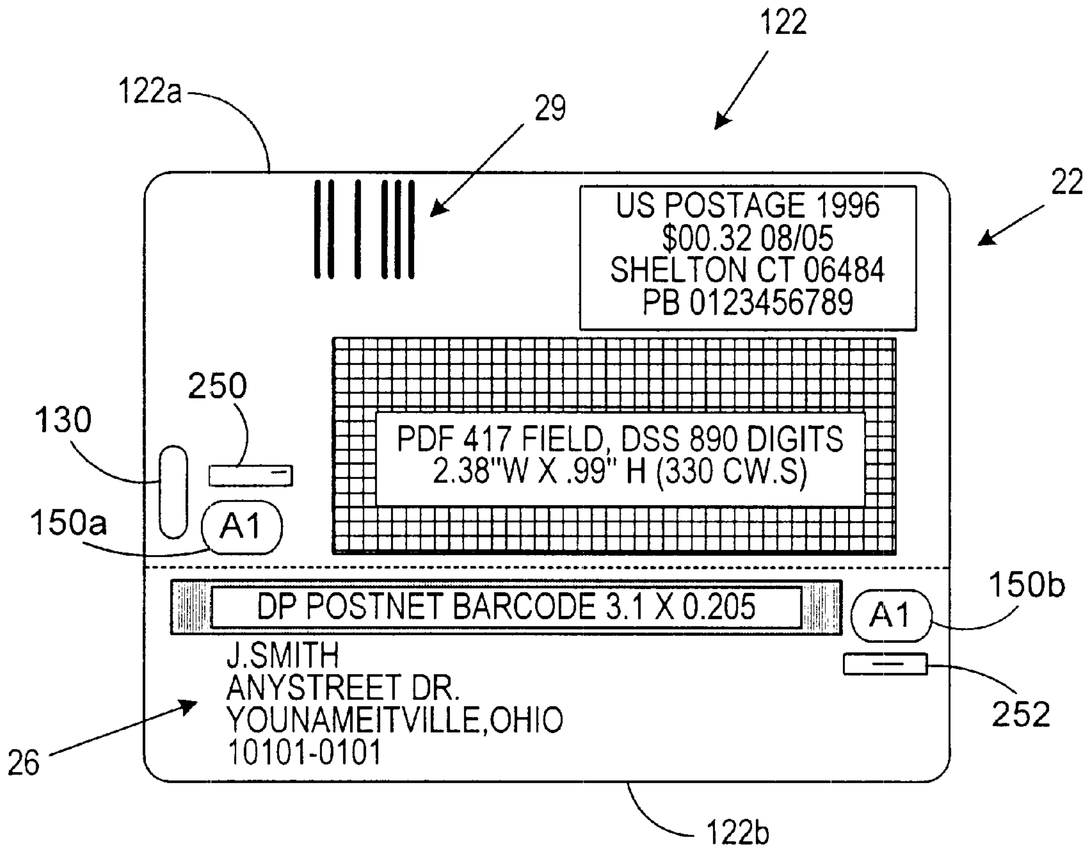
FIG. 4 is an enlarged view of a label including a postal indicium label segment and an address label segment in accordance with the present invention.

With the structure of the postage printing system 10 described as above, the operational characteristics will now be described. Referring to FIG. 4, in view of FIGS. 1–3, the production a mailing label 122 will be described with respect to a particular virtual meter environment complying with the current requirements of the United States Postal Service. Using the computer system 100, the user initiates a transaction session with the data center 200. Once the user's identity and account have been verified by the data center 200 using conventional techniques, the user uploads a recipient address 26 and desired postage amount to the data center 200. The data center 200 performs address hygiene on the received recipient address 26 by comparing it against an address hygiene database (not shown). At this time, any misspelled words are corrected and any missing information (zip code or zip +4) is filled in to yield a hygiened or corrected recipient address 26. If the data center 200 cannot verify the integrity of the recipient address 26 received from the user, then the user may be instructed to resubmit it.

Using the recipient address 26 and the desired postage amount, the data center 200 generates an encrypted message (not shown) as is well known in the art for printing on the envelope 20. The postal authority subsequently uses the encrypted message for verification purposes. The postage printing system 10 then prints the postage indicium 22, including a facer identification mark (FIM) (not required by all postal authorities) 29, on the postal indicium label segment 122*a* and the recipient address 26 on the address label segment 122*b*. The postage printing system 10 also prints a first inspection image 150*a* on the postal indicium label segment 122*a* and a second inspection image 150*b* on the address label segment 122*b*. Preferably, the inspection images 150*a* and 150*b* change from label to label so that consecutive labels 122 on the label stock 120 do not have the same inspection images 150*a* and 150*b*. In the most preferred embodiment as shown, the inspection images 150*a* and 150*b* are the same image and consist of an alphanumeric string that is easily human readable. Of course, the inspection images 150*a* and 150*b* as shown are "A1" and those skilled in the art will recognize that they should change between successive mailpieces 20 and not repeat too frequently.

Optionally, the postage printing system 10 may also print a first orientation image 250 on the postal indicium label segment 122*a* and a second orientation image 252 on the address label segment 122*b*. With printing on the label 122 complete, the user separates the label 122 from the web 120 and applies the segments 122*a* and 122*b* to the envelope 20 accordingly.

Figure 5:
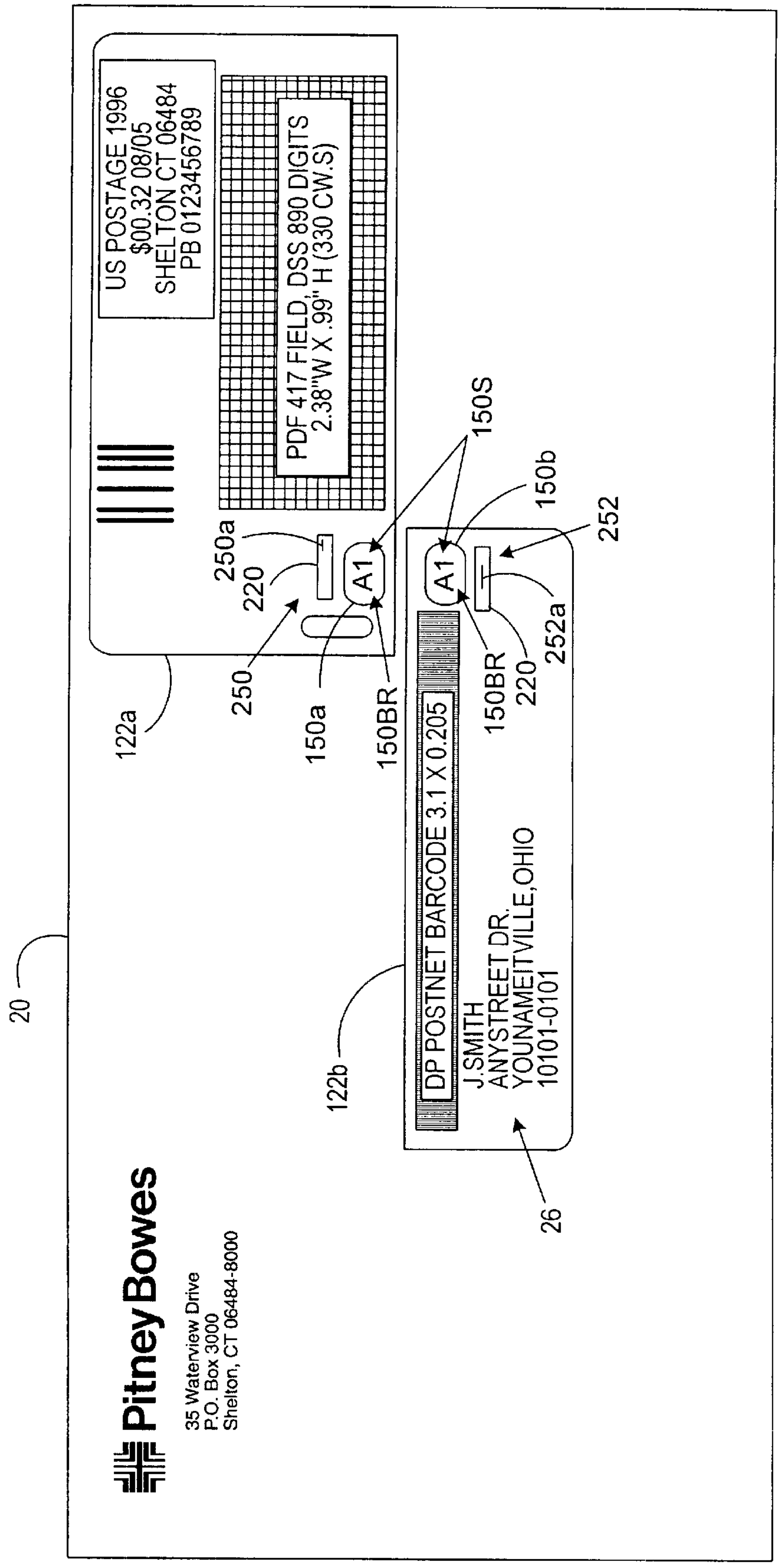
FIG. 5 is an envelope having the postal indicium label segment and the address label segment applied thereon in accordance with the present invention.

Referring to FIG. 5, an envelope 20 having the segments 122*a* and 122*b* assembled thereon is shown. The orientation images 250 and 252 include an envelope likeness 220 and placement indicators 250*a* and 250*b* respectively located within the envelope likeness 220 to show where to place the segments 122 and 122*b* on the envelope 20. Once the segments 122*a* and 122*b* have been assembled to the envelope 20, the inspection images 150*a* and 150*b* are brought in proximity to each other. Most preferably adjacent to each other. This is achieved because the inspection images 150*a* and 150*b* were suitably located on their respective segments 122*a* and 122*b* taking into consideration their final assembled positions.

Figure 6A:
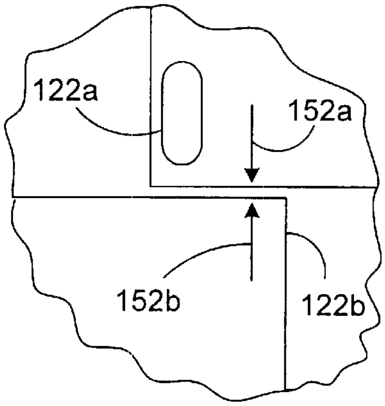
FIG. 6A is a cut-away view of an envelope having the postal indicium label segment and the address label segment applied thereon in accordance with an alternative embodiment of the present invention.
Figure 6B:
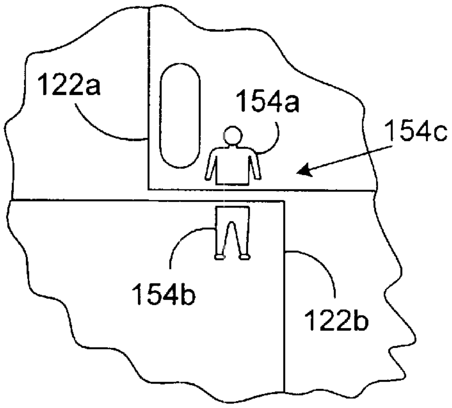
FIG. 6B is a cut-away view of an envelope having the postal indicium label segment and the address label segment applied thereon in accordance with another alternative embodiment of the present invention.
Figure 6C:
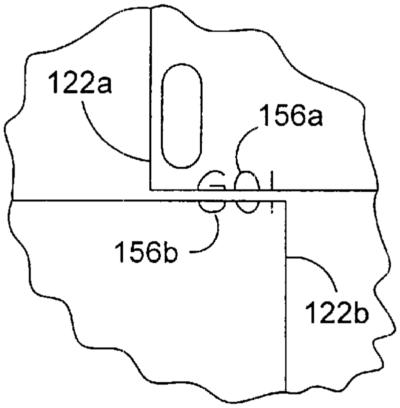
FIG. 6C is a cut-away view of an envelope having the postal indicium label segment and the address label segment applied thereon in accordance with still another alternative embodiment of the present invention.
Figure 6D:
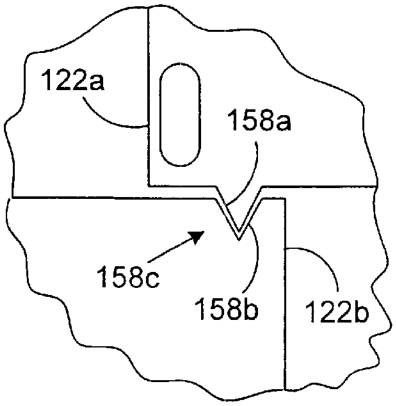
FIG. 6D is a cut-away view of an envelope having the postal indicium label segment and the address label segment applied thereon in accordance with yet still another alternative embodiment of the present invention.

Referring to FIGS. 6A, 6B, 6C and 6D in view of FIG. 5, alternative embodiments for the inspection images are shown. In FIG. 6A, a first inspection image 152*a* and a second inspection image 152*b* are shown. The images 152*a* and 152*b* are mirror images of each other. In FIG. 6B, a first inspection image 154*a* and a second inspection image 154*b* are shown. The images 154*a* and 154*b* are portions of a given composite image 154*c* that is recognizable by a human as being related. In FIG. 6C, a first inspection image 156*a* and a second inspection image 156*b* are shown. The images 156*a* and 156*b* are portions of a given composite image 156*c* that is an alphanumeric string. In FIG. 6D, an example of a composite image 158*c* that is not comprised of printed matter is shown. The composite image 158*c* includes a first inspection image 158*a* and a second inspection image 158*b* where the images 158*a* and 158*b* are die cut directly into the label stock. Thus, as these alternative embodiments demonstrate, all that is required is that the inspection images have a human visible relationship so indicating that the segments 122*a* and 122*b* match.

Referring to FIG. 5, an optional feature of the present invention will be discussed that is most beneficial when the user is seeking to qualify for postal discounts. Generally, most postal authorities offer postal rate discounts to those mailings that submit their mailpieces 20 in batches and sort the mailpieces 20 into a defined sequence according to each respective recipient address 26. In this further aspect of the present invention, the first inspection image 150*a* on the postal indicium label segment 122*a* and the second inspection image 150*b* on the address label segment 122*b* each include a batch run indicator 150BR and a batch sequence indicator 150S. In this case, the batch run indicator 150BR is the letter "A" and the batch sequence indicator 150S is the number "1". The next mailpiece 20 in this batch run would have the alphanumeric string "A2" as the first inspection image 150*a* and the second inspection image 150*b* designating the second mailpiece 20 in of the same batch run as the previous envelope. A subsequent batch run may employ "B1" as the first inspection image 150*a* and the second inspection image 150*b*. Those skilled in the art will now recognize that the user, as well as the postal authority, may keep all mailpieces 20 associated with the same batch run together and may keep them in proper order even if they become mixed up at some point during handling.

Those skilled in the art will now recognize that the present invention substantially addresses the disadvantages associated with the prior art by: (i) helping users locate the segments 122*a* and 122*b* properly on the envelope 20; (ii) providing a graphical clue so that the segments 122*a* and 122*b* from disparate labels 122 do not get mixed up; and (iii) providing an early indication to the postal authority before the envelope 20 is forwarded for verification processing that the postal indicium 22 does in fact correspond to the recipient address 26. As a result, the user and the postal authority save time and money due to the elimination of errors in transferring the label segments 122*a* and 122*b* from the label stock 120 to the envelope 20.

Many features of the preferred embodiment represent design choices selected to best exploit the inventive concept as implemented in a particular postage printing environment employing a virtual meter concept and a dedicated label printer. However, those skilled in the art will recognize that various modifications can be made without departing from the spirit of the present invention. For example, a general purpose printer may be employed with suitable label stock. As another example, the labels need not be on a web but may be individual label strips/sheets that are fed one at a time through the printer. As yet another example, the inspection images and/or orientation images may be pre-printed or printed real time. Similarly, the FIM may be pre-printed or printed real time. As still yet another example, orientation images may be employed with any embodiment discussed above. As still yet another example, batch run and batch sequence indicators may also be employed with any embodiment discussed above. As still yet another example, the inspection and orientation images may be combined into a composite image by placing the inspection image inside of the envelope likeness.

The embodiments and alternative described above are intended to be illustrative of the concepts of the present invention and by no means should be considered exhaustive. Therefore, the inventive concept in its broader aspects is not limited to the specific details of the preferred embodiments described above, but is defined by the appended claims and their equivalents.

What is claimed is:

1. A method of producing a mailpiece, comprising the step(s) of:

printing a postal indicium and a first inspection image on a first label segment;

printing a recipient address and a second inspection image on a second label segment, the first inspection image and the second inspection image having a human visible relationship indicating that the first label segment and the second label segment correspond to each other; and applying the first label segment and the second label segment to the mailpiece.

2. The method of claim 1, further comprising the step(s) of:

printing the first inspection image on the first label segment and the second inspection on the second label segment so that, when the first label segment and the second label segment are applied to the mailpiece, the first inspection image and the second inspection are adjacent.

3. The method of claim 2, further comprising the step(s) of:

changing the first inspection image and the second inspection image between successive mailpieces.

4. The method of claim 3, wherein:

the human visible relationship between the first inspection image and the second inspection image is one of the following: (i) identical images; (ii) mirror images; and (iii) portions of a given composite image.

5. The method of claim 4, further comprising the step(s) of:

printing a first orientation image on the first label segment, the first orientation image including an envelope likeness and a first label indicator showing where to apply the first label segment on the mailpiece; and printing a second orientation image on the second label segment, the second orientation image including the envelope likeness and a second label indicator showing where to apply the second label segment on the mailpiece.

6. The method of claim 1, further comprising the step(s) of:

printing a first orientation image on the first label segment, the first orientation image including an envelope likeness and a first label indicator showing where to apply the first label segment on the mailpiece; and printing a second orientation image on the second label segment, the second orientation image including the envelope likeness and a second label indicator showing where to apply the second label segment on the mailpiece.

7. The method of claim 1, further comprising the step(s) of:

printing within the first inspection image a batch run indicator and a sequence indicator; and printing within the second inspection image the batch run indicator and the sequence indicator.

8. The method of claim 7, further comprising the step(s) of:

printing the first inspection image on the first label segment and the second inspection on the second label segment so that, when the first label segment and the second label segment are applied to the mailpiece, the first inspection image and the second inspection are adjacent.

9. A method of operating a postage printing system to produce a mailpiece, the method comprising the step(s) of:

printing a postal indicium and a first inspection image on a first label segment; and printing a recipient address and a second inspection image on a second label segment, the first inspection image and the second inspection image having a human visible relationship indicating that the first label segment and the second label segment correspond to each other.

10. The method of claim 9, further comprising the step(s) of:

printing the first inspection image on the first label segment and the second inspection on the second label segment so that, when the first label segment and the second label segment are applied to the mailpiece, the first inspection image and the second inspection are adjacent.

11. The method of claim 10, further comprising the step(s) of:

changing the first inspection image and the second inspection image between successive mailpieces.

12. The method of claim 11, wherein:

the human visible relationship between the first inspection image and the second inspection image is one of the following: (i) identical images; (ii) mirror images; and (iii) portions of a given composite image.

13. The method of claim 12, further comprising the step(s) of:

printing a first orientation image on the first label segment, the first orientation image including an envelope likeness and a first label indicator showing where to apply the first label segment on the mailpiece; and printing a second orientation image on the second label segment, the second orientation image including the envelope likeness and a second label indicator showing where to apply the second label segment on the mailpiece.

14. The method of claim 9, further comprising the step(s) of:

printing a first orientation image on the first label segment, the first orientation image including an envelope likeness and a first label indicator showing where to apply the first label segment on the mailpiece; and printing a second orientation image on the second label segment, the second orientation image including the envelope likeness and a second label indicator showing where to apply the second label segment on the mailpiece.

15. The method of claim 9, further comprising the step(s) of:

printing within the first inspection image a batch run indicator and a sequence indicator; and printing within the second inspection image the batch run indicator and the sequence indicator.

16. The method of claim 15, further comprising the step(s) of:

printing the first inspection image on the first label segment and the second inspection on the second label segment so that, when the first label segment and the second label segment are applied to the mailpiece, the first inspection image and the second inspection are adjacent.

17. A postage printing system, comprising:

a printer for printing on a label, the label including a first label segment and a second label segment; and a computer system in operative communication with the printer for controlling the printer, the computer system capable of causing the printer to print a postal indicium and a first inspection image on a first label segment and a recipient address and a second inspection image on a second label segment; and wherein:

the first inspection image and the second inspection image have a human visible relationship indicating that the first label segment and the second label segment correspond to each other.

18. The system of claim 17, wherein:

the first inspection image is printed on the first label segment and the second inspection is printed on the second label segment so that, when the first label segment and the second label segment are applied to the mailpiece, the first inspection image and the second inspection are adjacent.

19. The system of claim 18, wherein:

the computer system is further capable of changing the first inspection image and the second inspection image between successive mailpieces.

20. The system of claim 19, wherein:

the human visible relationship between the first inspection image and the second inspection image is one of the following: (i) identical images; (ii) mirror images; and (iii) portions of a given composite image.

21. The system of claim 20, wherein:

the computer system is further capable of causing the printer to print:

a first orientation image on the first label segment where the first orientation image includes an envelope likeness and a first label indicator showing where to apply the first label segment on the mailpiece; and a second orientation image on the second label segment where the second orientation image includes the envelope likeness and a second label indicator showing where to,apply the second label segment on the mailpiece.

22. The system of claim 17, wherein:

the computer system is further capable of causing the printer to print:

a first orientation image on the first label segment where the first orientation image includes an envelope likeness and a first label indicator showing where to apply the first label segment on the mailpiece; and a second orientation image on the second label segment where the second orientation image includes the envelope likeness and a second label indicator showing where to apply the second label segment on the mailpiece.

23. The system of claim 17, wherein:

the computer is further capable of causing the printer to print:

a batch run indicator and a sequence indicator within the first inspection image; and image the batch run indicator and the sequence indicator within the second inspection.

24. The system of claim 23, wherein:

the first inspection image is printed on the first label segment and the second inspection is printed on the second label segment so that, when the first label segment and the second label segment are applied to the mailpiece, the first inspection image and the second inspection are adjacent.

* * * * *